DEFLECTION SYSTEM FOR CATHODE RAY TYPE STORAGE TUBES
Original Filed Dec. 2, 1954
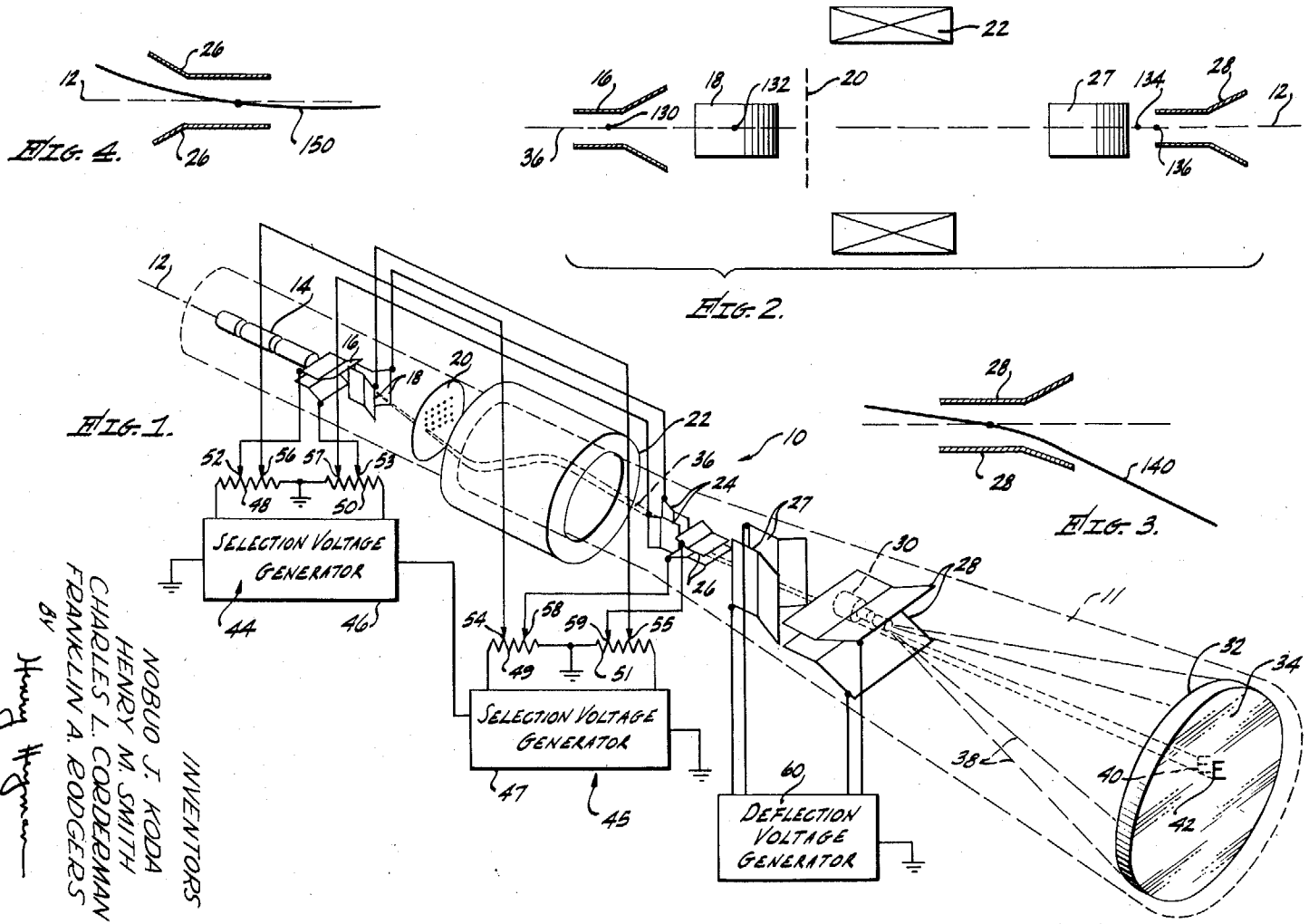
INVENTORS
NOBUO J. KODA
HENRY M. SMITH
CHARLES L. CORDERMAN
FRANKLIN A. RODGERS
BY Henry Heyman
ATTORNEY.

United States Patent Office

Re. 25,221
Reissued Aug. 7, 1962

25,221

DEFLECTION SYSTEM FOR CATHODE RAY TYPE STORAGE TUBES

Nobuo J. Koda, Culver City, and Henry M. Smith, Pacific Palisades, Calif., and Charles L. Corderman, Winchester, and Franklin A. Rodgers, Concord, Mass.; said Koda and said Smith assignors to Hughes Aircraft Company, a corporation of Delaware, and said Corderman and said Rodgers assignors, by mesne assignments, to Research Corporation, New York, N.Y., a corporation of New York Original No. 2,769,116, dated Oct. 30, 1956, Ser. No. 472,664, Dec. 2, 1954. Application for reissue Dec. 6, 1957, Ser. No. 701,695

10 Claims. (Cl. 315—24)

Matter enclosed in heavy brackets [ ] appears in the original patent but forms no part of this reissue specification; matter printed in italics indicates the additions made by reissue.

This invention relates to electron discharge devices and more particularly to an improved deflection system for a character writing cathode-ray type storage tube.

A character writing storage tube which has recently been developed is described in a copending application, Serial No. 387,984, now Patent No. 2,727,872, filed by Henry M. Smith on October 23, 1953, entitled "Direct Viewing Storage Tube With Character Writing Electron Gun." The storage tube of this application essentially comprises a writing beam electron gun, two pairs of character-selection plates, a thin metallic apertured character matrix, an electron lens for focusing the character matrix on a storage target assembly, two pairs of writing beam deflection plates for directing the focused electron writing beam towards selected elemental areas of the storage target assembly, and a luminescent viewing screen. An electron flood gun is also positioned adjacent the writing beam deflection plates of the storage tube to reproduce information stored by the target electrode on the viewing screen. The writing beam produced by the writing beam gun is directed through the selection plates which direct the writing beam through one of the apertures in the character matrix which has the outline of a selected character. The beam is thus shaped to have a cross-section corresponding to a desired character. The electron lens is employed to focus the beam on a predetermined elemental area of the storage target assembly irrespective of the aperture in the character matrix which it has traversed, and the deflection plates are employed to deflect the writing beam from this predetermined elemental area to selected elemental areas on the storage target in accordance with the information to be reproduced.

In the event the electron lens used is a magnetic lens, the electron beam will be converged toward the axis of the tube and at the same time be rotated. In this respect, the device of the present invention is primarily concerned with a deflection system employing a magnetic lens or "converging" coil. Accordingly a selection voltage is applied to the selection plates to direct the beam through the character matrix at small angles with respect to the longitudinal axis of the tube and the converging coil converges the writing beam back toward the axis of the tube. However, at the deflection plates, the stream is inherently projected through the plates so as to have a trajectory which is generally at one of the above mentioned small angles with respect to the axis of the tube. It will then be impossible to center each character within a single predetermined elemental area on the storage target without correcting for the transverse motion imparted to the stream by the electrostatic field produced between the selection plates, i.e., misreregistration of the beam at the target will result.

It is, therefore, an object of the invention to provide an improved deflection system for a character writing cathode-ray type storage tube.

Another object of the invention is to provide means whereby character misreregistration produced by the selection of a writing character in deflecting a writing beam of electrons in a character writing storage tube is minimized.

In accordance with the invention, a separate or additional set of metallic correction or compensation plates is disposed about the longitudinal axis of a character writing storage tube between the electron lens or converging coil and the deflection plates. A voltage proportional to the voltage between the selection plates is then applied to the compensation plates to direct the writing beam, having a cross section determined by any perforation or aperture in the character matrix, along the longitudinal axis of the tube through the deflection plates.

The novel features which are believed to be characteristic of the invention, both as to its organization and method of operation, together with further objects and advantages thereof, will be better understood from the following description considered in connection with the accompanying drawings in which an embodiment of the invention is illustrated by way of example. It is to be expressly understood, however, that the drawings are for the purpose of illustration and description only, and are not intended as a definition of the limits of the invention.

FIG. 1 is an isometric view of the deflection system of the present invention;

FIG. 2 is a symmetric sectional view of a portion of the deflection system shown in FIG. 1;

FIG. 3 is a symmetric sectional view of a pair of metallic deflection plates shown with a typical uncorrected writing beam trajectory; and FIG. 4 is a symmetric sectional view of a pair of metallic compensation plates shown with a typical corrected writing beam trajectory.

Referring to FIG. 1, a writing beam deflection system 10 is shown for recording any character such as, for example, a number or a letter. The deflection system 10 is employed in the evacuated envelope 11 of a storage tube, the axis of which is indicated by 12. At the left extremity of the envelope 11, as viewed in FIG. 1, a writing beam electron gun 14 is shown.

In the direction of electron flow from the gun 14, there is shown a first pair of character-selection plates 16, a second pair of metallic character-selection plates 18, a character matrix 20, a converging coil 22, a first pair of compensation plates 24, a second pair of compensation plates 26, and two pairs of metallic deflection plates 27, 28. A flood gun 30 is positioned adjacent one of the deflection plates 28 to reproduce information stored on a storage target 32, which is positioned transversely to the axis 12 directly to the right of the flood gun 30 as shown in the drawing. Also, a luminescent viewing screen 34 is disposed adjacent to and to the right of the storage target 32 as shown in the drawing.

The character matrix 20 is constituted of a thin metallic plate having apertures therein in the form of characters such as letters or numbers which may be portrayed on the viewing screen 34. Writing gun 14 is employed to produce a writing beam, which is directed from the writing gun 14 to the storage target 32 along path 36 through the character matrix 20. Flood electrons are directed from the flood gun 30 to the viewing screen 34 along paths indicated by 38. On the storage target 32, the reference numeral 40 indicates the position of a letter "E" being "written" or recorded on the storage target 32; and numeral 42 indicates the letter "E" being reproduced by operation of the flood gun 30 on the viewing screen 34.

Two deflection circuits 44 and 45, which are used to elect a character in the matrix 20 and to aid in redirect-ıg the stream along the axis 12, are shown comprising wo selection voltage generators 46 and 47 which are onnected across two pairs of voltage dividers 48 and 50, 9 and 51. The common junction of the voltage dividers 8 and 50, 49 and 51 may then be grounded or main-ained at another appropriate reference potential. The wo pairs of character selection plates 16 and 18 are onnected to taps 52 and 53, 54 and 55 on voltage di-iders 48 and 50, 49 and 51, respectively. Correspond-ıg compensation plates are connected to taps 56 and 7, 58 and 59, on voltage dividers 48 and 50, 49 and 51, espectively.

The sensitivity of deflection plates are rated in trans-erse deflection per unit voltage. Alternatively, the ompensation plates 24 and 26 may have applied voltages qual to the character selection voltages applied to the election plates 16 and 18, respectively, if the compen-ation plates have the same sensitivity as their corre-ponding character selection plates.

By the action of converging coil 22, the writing beam 6 will be rotated as it is directed from the character election plates to the compensation plates. In order ɔ eliminate a possible error from this rotation, the onverging coil may be designed to rotate the beam 90 nechanical degrees. For this reason, compensation lates 24 and 26 are disposed at an angle of 90 degrees vith respect to their corresponding character selection lates 16 and 18, respectively. The converging coil 22 nay, of course, be designed to rotate the writing beam 36 hrough any other angle so long as the compensation lates are appropriately and proportionately positioned.

A deflection voltage generator 60 is connected to the leflection plates 27 and 28 for directing the writing eam toward a selected elemental area on the storage arget 32.

In the absence of any sort of compensation plates such s the plates 24 and 26, the writing beam 36 is directed hrough a selected aperture in the character matrix 20 nd converged back towards the axis 12 by converging oil 22. The writing beam 36 then crosses the axis 12 t some point between the deflection plates 27 and 28. The deflection plates may then direct the beam 36 to ny particular elemental area on the storage target 32 ɔ write or to record any given character on the target. Any character represented in the chamber matrix 20 nay thus be first selected by selection generators 46 and 7 and then positioned anywhere on the storage target 2. However, it is generally desirable to reproduce each elected character at the same position in any chosen lemental area on the viewing screen 42, which is se-ected by appropriate selection voltages.

If compensation plates are not employed for redirect-ng the writing beam 36 along the axis 12 through the leflection plates 27, 28, it will be impossible to deflect ach character in the character matrix 20 to approxi-nately the same elemental area on the storage target 32 vith the same deflection voltages impressed upon the leflection plates 27, 28.

It is undesirable to apply an additional voltage to the leflection plates in order to compensate for the transverse notion of the writing beam 36 as it leaves the region of he converging coil 22. In the first place, the addition f a correction voltage to the deflection voltage requires hat a substantial amount of additional circuitry be pro-ided. Further, the maximum voltage swing of the de-lection plates would be increased. The latter is unde-irable because a portion of the flood electrons produced y the flood gun 30 inevitably return on the positive plate f the deflection plates 27, 28 and tend to load the de-lection voltage amplifier. The deflection voltage am-lifier is generally not impervious to deflection plate cur-ent, and the deflection voltage will thereby be changed, vhereby other misregistration errors will be introduced.

These other errors cannot be corrected with any substan-tial degree of facility because the flood electron current to a positive deflection plate is not a linear function of the deflection plate voltage.

It is further desirable to make the deflection plates as short as possible when compensation plates are not em-ployed. This is illustrated in FIG. 2 where character selection plates 16 and 18 are shown disposed to the left of character matrix 20 and where converging coil 22 is shown adjacent character matrix 20 and deflection plates 27, 28 are shown to the right of converging coil 22. By an extrapolation of the writing beam trajectory, the writing beam 36 can be thought of as leaving the axis at a focal point 130 within the selection plates 16 and at a second focal point 132 within the selection plates 18. Converging coil 22 then redirects this stream back toward the axis 12 at two separate focal points 134 and 136 corresponding, respectively, to the focal points 130 and 132. A representative value of distance between the focal points 134 and 136 is 0.25 inch. This means that perfect correction by applying an additional cor-rection voltage to the deflection plates 27, 28 can never be accomplished because the focal points 134 and 136 cannot be made to fall at the center of the vertical and horizontal deflection plates 27 and 28. Better correc-tions can, however, be obtained by making the deflection plates as short as possible whereby their centers will be brought closer to the focal points 134 and 136. It is further desirable to make the deflection plates 27, 28 as short as possible because a leakage magnetic field produced by the converging coil 22 causes the writing beam 36 to rotate as it passes through both the vertical and the horizontal deflection plates 27, 28. The vertical deflection plates will generally be at right angles to the horizontal deflection plates. Since there is rotation of the beam between the vertical and horizontal deflection plates, an error is produced, the electrical deflection pro-duced on the beam by each pair of deflection plates being no longer at right angles with respect to each other.

The lengths of the deflection plates 27, 28 are limited by the sensitivity necessary to produce deflection with a practicable deflection voltage. A representative length for the deflection plates 27, 28 is 1.5 inches. The fact that deflection plates 27, 28 must be of a substantial length is illustrated in FIG. 3 where a writing beam tra-jectory 140 is illustrated. The sensitivity of a pair of deflection plates is directly proportional to the length of the plates and inversely proportional to their spacing and the axial accelerating voltage of the writing beam.

In order to prevent an interception of writing beam 36, the plates 28 shown in FIG. 3, must therefore be spaced a substantial distance apart. In order to maintain an adequate sensitivity, deflection plates 28 must, therefore, have an extended length. This is not true of the com-pensation plates 24 and 26 because, as illustrated in FIG. 4, the compensation plates 26 are shown with a modified writing beam trajectory 150. The compensation plates 26 only serve to redirect the writing beam 36 along the axis 12 of the deflection system 10, and therefore may be disposed closer to the axis 12 and made shorter. A representative length may be 0.75 inch.

What is claimed is:

1. In a cathode-ray [type storage] tube having a writ-ing beam gun for producing a writing beam of electrons, a writing beam deflection system comprising a character matrix spaced from the writing beam gun, means for directing the writing beam from the writing beam gun toward said character matrix, two pairs of character selection plates disposed about the path of the beam in quadrature with each other for directing the beam to a selected area on said character matrix, means for produc-ing a magnetic lens adjacent said character matrix for focusing the portion of the beam penetrating through said character matrix on a predetermined plane spaced a substantial distance therefrom, two pairs of compensation plates disposed about the path of the beam at an angle with respect to that of said selection plates equal to the amount of rotation imparted to the beam by said magnetic lens, means for applying a difference of potential between said selection plates, and means for applying a difference of potential between said compensation plates proportional to the difference of potential applied between said selection plates.

2. In a cathode-ray [type storage] tube having a writing beam gun for producing a writing beam of electrons, a writing beam deflection system comprising an apertured character matrix having apertures in the shape of characters, means for directing the writing beam from the writing beam gun toward said character matrix, two pairs of character selection plates disposed about the path of the beam for directing the beam through a selected aperture in said character matrix, a convering coil disposed adjacent said character matrix about the path of the beam for converging the beam toward a predetermined focal point, said converging coil imparting substantially 90 degrees rotation to the writing beam, two pairs of compensation plates disposed at an angle of substantially 90 degrees with respect to that of said selection plates, said compensation plates being disposed near said focal point along the writing beam path, means for applying a difference of potential between said selection plates, and means for applying a difference of potential between said compensation plates substantially proportional to the difference of potential applied between said selection plates, whereby the writing beam is redirected along the axis of the tube.

3. In a cathode-ray [type storage] tube having a writing beam gun for producing a writing beam of electrons, a writing beam deflection system comprising an apertured character matrix having apertures in the shape of informative symbols, means for directing the writing beam from the writing beam gun toward said character matrix, two pairs of character selection plates disposed about the path of the beam in quadrature with each other for directing the beam through a selected aperture in said character matrix, a converging coil disposed adjacent said character matrix about the path of the beam for converging the beam toward a predetermined focal point, said converging coil imparting substantially 90 degrees rotation to the writing beam, two pairs of compensation plates disposed at an angle of substantially 90 degrees with respect to that of said selection plates, said compensation plates being disposed near said focal point along the path of the writing beam, and means for applying the same difference of potential between said selection plates and between said compensation plates, said selection plates and said compensation plates having substantially the same sensitivity.

4. In a cathode-ray [type storage] tube having a writing beam gun for producing a writing beam of electrons and a [storage] target for [storing] an electrostatic charge pattern, a writing beam deflection system comprising a character matrix spaced from the writing beam gun, means for directing the writing beam from the writing beam gun toward said character matrix, two pairs of character selection plates disposed about the path of the beam for directing the beam to a selected area on said character matrix, a converging coil disposed adjacent said character matrix about the path of the beam for converging the beam toward a predetermined focal point, two pairs of compensation plates disposed about the path of the beam at an angle with respect to that of said selection plates equal to the amount of rotation imparted to the beam by said converging coil, said compensation plates being disposed near said focal point along the writing beam path, two pairs of deflection plates disposed adjacent said compensation plates and about the path of the writing beam, means for applying a difference of potential between said selection plates, means for applying a difference of potential between said compensation plates proportional to the difference c potential applied between said selection plates, and mean for applying a difference of potential between said de flection plates to direct the writing beam toward a selec tion elemental area on [the] said [storage] target.

5. In a cathode-ray [type storage] tube having a wri ing beam gun for producing a writing beam of electron a writing beam deflection system comprising an ape tured character matrix having apertures in the shape o characters, means for directing the writing beam fror the writing beam gun toward said character matrix, firs and second pairs of character selection plates dispose at right angles with respect to each other successivel along the path of the beam for directing the beam throug a selected aperture in said character matrix, a converg ing coil disposed adjacent said character matrix about th path of the beam for converging the beam toward predetermined focal point, said converging coil impart ing substantially 90 degress rotation to the writing beam first and second pairs of compensation plates dispose at an angle of substantially 90 degrees with respect t said first and second pairs of selection plates, respectively said compensation plates being disposed near said foca point along the writing beam path, means for applyin a difference of potential between said selection plates and means for applying a difference of potential betwee said compensation plates substantially proportional t the difference of potential applied between said selectio plates, whereby the writing beam is redirected along th axis of the tube.

6. A cathode-ray [type storage] tube comprising a evacuated envelope, a writing beam gun disposed at on end of said envelope for producing a writing beam of elec trons, a target electrode disposed at the opposite end o said envelope for [storing] an electrostatic charge pat tern, an apertured character matrix, having apertures i the shape of informative symbols spaced from said writ ing beam gun, means for directing said writing bean from said writing beam gun toward said character matri along a predetermined path, first and second pairs of char acter selection plates disposed at right angles with respec to each other successively along said path for directin said beam through a selected aperture in said characte matrix, a converging coil disposed adjacent said characte matrix about the path of said beam for converging sai beam toward a predetermined focal point, said converg ing coil imparting substantially 90 degrees rotation t said writing beam, first and second pairs of compensatio plates disposed at an angle of substantially 90 degree with respect to said first and second pairs of said selectio plates, respectively, said compensation plates being dis posed near said focal point along the path of said writin beam, two pairs of deflection plates disposed adjacen said compensation plates about the path of said writin beam, means for applying the same difference of potentia between said seleciton plates and said compensation plate having substantially the same sensitivity, and means fo applying a difference of potential between said deflectio plates to direct said writing beam to a selected elemental area on said [storage] target.

*7. In an evacuated container having a target at one end and a source of electrons at the other end for projecting a beam of electrons toward the target substantially along a longitudinal axis of said container, a beam-shaping member having a plurality of character cutout portions for selectively altering the cross-sectional shape of the beam in accordance with one of said portions of the beam-shaping member through which the electron beam is projected, a first deflection means for deflecting the beam to cause the beam to pass sequentially through said portions of the beam-shaping member, a convergence means for substantially focusing and converging the beam to a predetermined focus point on said axis, a second deflection means substantially adjacent said focus point being adapted to reference the shaped beam to and along axis,*

*l a third deflection means for deflecting the beam from s to predetermined locations on the target.*

*8. In a cathode ray tube having an apertured charac- forming matrix, a first deflection system for first di- ting an electron beam toward said apertured character ming matrix, a second deflection system for directing d electron beam toward a target after said beam has ssed through said apertured character forming matrix, d first and second deflection systems being disposed ng the axis of said tube, converging means disposed tween said deflection systems for directing said beam ck toward said tube axis after said beam has been de- cted off of said tube axis by said first deflection sys- n, and means disposed between said converging means d said second deflection system for directing said beam ng said tube axis after said beam has been directed vards said axis by said converging means.*

*9. In a cathode ray tube having an apertured character ming matrix and a longitudinal axis, a first deflection stem for first directing an electron beam away from axis toward said apertured character forming matrix, second deflection system for directing said electron am toward a target after said beam has passed through id apertured character forming matrix, said first and cond deflection systems being disposed along the axis said tube, an electron lens disposed between said de- ction systems for directing said beam back toward said be axis after said beam has been deflected away from id tube axis by said first deflection system, and compen-*

*sation means disposed between said matrix and the second deflection means for directing said beam along said tube axis.*

*10. In a cathode ray tube having an apertured character forming matrix and a longitudinal axis, an electrostatic first deflection system for first directing an electron beam toward a selected area of said apertured character forming matrix, an electron lens adjacent said character forming matrix for directing said beam back toward the axis of said tube after it has been directed to a selected area on said character matrix, electrostatic compensation means disposed about the tube axis in the vicinity of the beam intersection with said axis, said compensation means serving to redirect said beam along said tube axis, second deflection means for directing said electron beam toward a target, means for applying a potential to said first deflection system, and means for applying a potential to said compensation means proportional to the potential applied to said first deflection system.*

References Cited in the file of this patent or the original patent

UNITED STATES PATENTS

| | | |
|---|---|---|
| 1,932,084 | Opsahl | Oct. 24, 1933 |
| 2,083,209 | Von Ardenne | June 8, 1937 |
| 2,275,017 | McNaney | Mar. 3, 1942 |
| 2,433,340 | Burgess | Dec. 30, 1947 |
| 2,666,162 | Hollway et al. | Jan. 12, 1954 |
| 2,696,571 | Law | Dec. 7, 1954 |